US009612329B2

(12) United States Patent
Chen et al.

(10) Patent No.: US 9,612,329 B2
(45) Date of Patent: Apr. 4, 2017

(54) APPARATUS, SYSTEM AND METHOD FOR SPACE STATUS DETECTION BASED ON ACOUSTIC SIGNAL

(71) Applicant: Industrial Technology Research Institute, Hsinchu (TW)

(72) Inventors: Ming-Yen Chen, Pingtung County (TW); Jia-Ching Wang, New Taipei (TW); Chen-Guei Chang, Taoyuan (TW); Chang-Hong Lin, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 14/798,479

(22) Filed: Jul. 14, 2015

(65) Prior Publication Data
US 2016/0091604 A1    Mar. 31, 2016

(30) Foreign Application Priority Data
Sep. 30, 2014   (TW) .............................. 103133958 A

(51) Int. Cl.
*G01S 15/00* (2006.01)
*G01S 15/04* (2006.01)
(Continued)

(52) U.S. Cl.
CPC .............. *G01S 15/04* (2013.01); *G01S 7/527* (2013.01); *G01S 15/523* (2013.01); *G01S 15/88* (2013.01); *G08B 13/1672* (2013.01)

(58) Field of Classification Search
CPC ............ G08B 13/1618; G08B 13/1672; G01S 13/878; G01S 15/04; G01S 15/523; G01S 7/527
(Continued)

(56) References Cited

U.S. PATENT DOCUMENTS

| 5,576,972 A | 11/1996 | Harrison |
| 5,937,092 A | 8/1999 | Wootton et al. |

(Continued)

FOREIGN PATENT DOCUMENTS

| CN | 100543494 | 9/2009 |
| GB | 2294118 | 4/1996 |

(Continued)

OTHER PUBLICATIONS

Antonacci et al., "Inference of Room Geometry from Acoustic Impulse Response," IEEE Transactions on Audio, Speech and Language Processing, Dec. 2012, pp. 2683-2695.
(Continued)

*Primary Examiner* — John A Tweel, Jr.
(74) *Attorney, Agent, or Firm* — Jianq Chyun IP Office

(57) ABSTRACT

An apparatus, a system and a method for space status detection based on acoustic signal are provided. The detecting apparatus includes an audio transmitting device, an audio receiving device, a signal processing device and a decision device. The audio transmitting device transmits an acoustic signal into a space. The audio receiving device receives a varied acoustic signal as a sensing signal. The signal processing device is coupled to the audio receiving device to receive the sensing signal and generates a characteristic parameter of a space status according to the sensing signal. The decision device is coupled to the signal processing device to receive the characteristic parameter and detects a change of the space status according to the characteristic parameter.

25 Claims, 18 Drawing Sheets

(51) Int. Cl.
*G08B 13/16* (2006.01)
*G01S 7/527* (2006.01)
*G01S 15/52* (2006.01)
*G01S 15/88* (2006.01)

(58) Field of Classification Search
USPC .......................... 367/93, 99; 340/541, 686.1
See application file for complete search history.

(56) References Cited

U.S. PATENT DOCUMENTS

| | | | |
|---|---|---|---|
| 5,956,424 | A | 9/1999 | Wootton et al. |
| 5,973,996 | A | 10/1999 | Zhevelev et al. |
| 6,104,831 | A | 8/2000 | Ruland |
| 6,243,036 | B1 | 6/2001 | Chadwick et al. |
| 6,271,762 | B1 * | 8/2001 | Murad .................... G01S 7/539 340/686.1 |
| 6,342,696 | B1 | 1/2002 | Chadwick |
| 6,825,456 | B2 | 11/2004 | Chadwick et al. |
| 6,856,271 | B1 | 2/2005 | Hausner |
| 6,922,145 | B2 * | 7/2005 | Piesinger .............. G01S 15/878 340/541 |
| 7,167,123 | B2 | 1/2007 | Hausner et al. |
| 7,301,456 | B2 | 11/2007 | Han |
| 7,450,052 | B2 | 11/2008 | Hausner et al. |
| 7,499,837 | B2 | 3/2009 | Szeto |
| 7,526,105 | B2 | 4/2009 | Dronge |
| 7,535,351 | B2 * | 5/2009 | Reymond .......... G08B 13/1672 340/541 |
| 8,018,792 | B2 | 9/2011 | Kyun et al. |
| 2009/0097670 | A1 | 4/2009 | Jeong et al. |
| 2009/0316913 | A1 | 12/2009 | McGrath |
| 2013/0336093 | A1 | 12/2013 | Suvanto |

FOREIGN PATENT DOCUMENTS

| | | |
|---|---|---|
| TW | 201301912 | 1/2013 |
| TW | 201301972 | 1/2013 |
| TW | M463370 | 10/2013 |
| WO | 2005074320 | 8/2005 |
| WO | 2013021372 | 2/2013 |
| WO | 2014126683 | 8/2014 |

OTHER PUBLICATIONS

Parhizkar et al., "Single-channel Indoor Microphone Localization," IEEE International Conference on Acoustics, Speech, and Signal Processing, May 2014, pp. 546-554.

Shabtai et al., "Feature Selection for Room Volume Identification from Room Impulse Response," IEEE Workshop on Applications of Signal Processing to Audio and Acoustics, Oct. 18-21, 2009, pp. 249-252.

Shabtai et al., "Room volume classification from room impulse response using statistical pattern recognition and feature selection," The Journal of the Acoustical Society of America, Sep. 2010, pp. 1155-1162.

Dokmanic et al., "Acoustic echoes reveal room shape," Proceedings of the National Academy of Sciences, Jul. 2013, pp. 12186-12191.

Dokmanic et al., "Can One Hear the Shape of Room: The 2-D Polygonal Case," IEEE International Conference on Acoustics, Speech and Signal Processing (ICASSP), May 22-27, 2011, pp. 321-324.

Adib et al., "3D Tracking via Body Radio Reflections," Computer Science and Artificial Intelligence Laboratory Technical Report, Dec. 2013, pp. 1-13.

Adib et al., "See Through Walls with Wi-Fi!," Proceedings of the ACM SIGCOMM 2013 Conference on SIGCOMM, Aug. 2013, pp. 75-86.

"Office Action of Europe Counterpart Application", issued on Feb. 18, 2016, p. 1-p. 11.

"Office Action of Taiwan Counterpart Application", issued on Nov. 19, 2015, p. 1-p. 11.

* cited by examiner

APPARATUS, SYSTEM AND METHOD FOR SPACE STATUS DETECTION BASED ON ACOUSTIC SIGNAL

CROSS-REFERENCE TO RELATED APPLICATION

This application claims the priority benefit of Taiwan application serial no. 103133958, filed on Sep. 30, 2014. The entirety of the above-mentioned patent application is hereby incorporated by reference herein and made a part of this specification.

TECHNICAL FIELD

The disclosure relates to space status detection, and particularly relates to an apparatus, a system and a method for space status detection based on acoustic signal.

BACKGROUND

Along with quick development of technology, and people's increasing demand on living standard, smart home becomes a development trend in recent years. In applications of the existing smart home, home security and safety care are relatively mature and popular, and a safety monitoring function can be achieved through a sensing network and sensing information analysis.

Generally, hardware cost of the safety monitoring system is expensive, and cost is one of the considerations in user's purchase activity. Therefore, how to reduce the hardware cost of the safety monitoring/detection apparatus has become one of the issues in development of related techniques.

SUMMARY

The disclosure is directed to an apparatus, a system and a method for space status detection based on an acoustic signal.

The disclosure provides a space status detection apparatus based on acoustic signal, which includes an audio transmitting device, an audio receiving device, a signal processing device and a decision device. The audio transmitting device transmits an acoustic signal into a space. The audio receiving device receives a varied acoustic signal that the transmitted acoustic signal is varied in the space to serve as a sensing signal. The signal processing device coupled to the audio receiving device receives the sensing signal and generates a characteristic parameter of a space status according to the sensing signal. The decision device is coupled to the signal processing device to receive the characteristic parameter and detects a change of the space status according to the characteristic parameter.

The disclosure provides a space status detection system based on acoustic signal including the aforementioned space status detection apparatus, and further including an electronic device and a network device. When the space status detection apparatus detects that the space status is changed, the space status detection apparatus transmits a message to the electronic device through the network device.

The disclosure provides a method for space status detection based on acoustic signal. An acoustic signal is transmitted into a space, and a varied acoustic signal that the transmitted acoustic signal is varied in the space is received to serve as a sensing signal. A characteristic parameter is obtained according to the sensing signal. A changes of the space status is detected according to the characteristic parameter.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
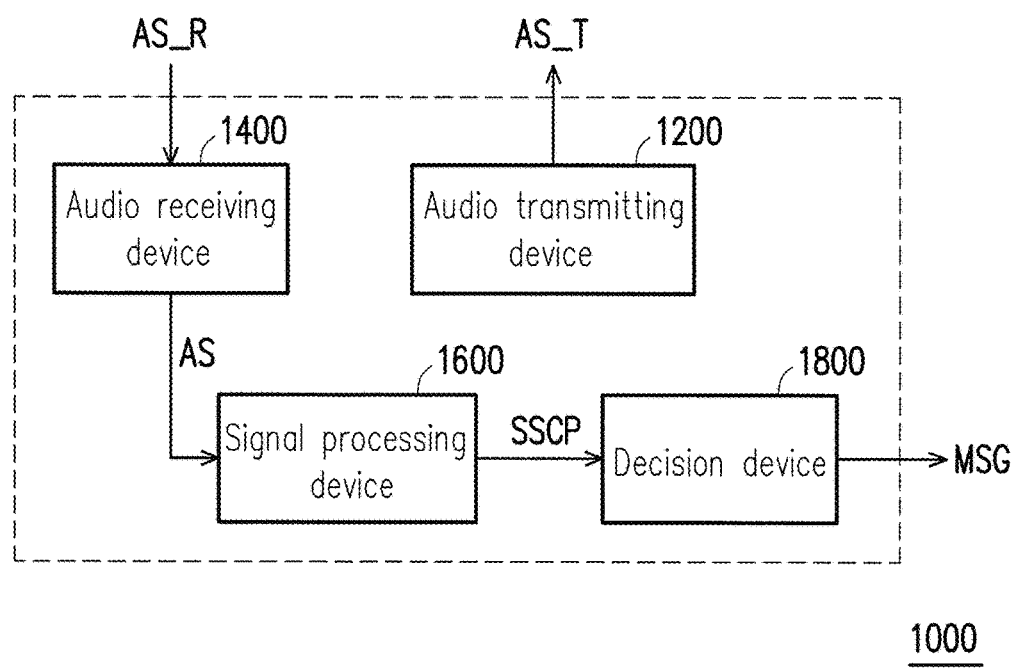
FIG. 1 is a block schematic diagram of a space status detection apparatus based on acoustic signal according to an embodiment of a disclosure.

Reference will now be made in detail to the present embodiments of the disclosure, examples of which are illustrated in the accompanying drawings. Wherever possible, the same reference numbers are used in the drawings and the description to refer to the same or like parts.

Referring to FIG. 1, FIG. 1 is a block schematic diagram of a space status detection apparatus 1000 based on acoustic signal according to an embodiment of a disclosure. The space status detection apparatus 1000 based on acoustic signal includes an audio transmitting device 1200, an audio receiving device 1400, a signal processing device 1600 and a decision device 1800. The audio transmitting device 1200 transmits an acoustic signal AS_T into a space (not shown). The audio receiving device 1400 receives a varied acoustic signal AS_R of the acoustic signal AS_T varied in the space to serve as an audio sensing signal AS. The signal processing device 1600 receives the audio sensing signal AS transmitted by the audio receiving device 1400, and generates a space status characteristic parameter SSCP according to the audio sensing signal AS. The decision device 1800 receives the space status characteristic parameter SSCP transmitted by the signal processing device 1600, and detects changes of a space status in different times according to the space status characteristic parameter SSCP.

In the present embodiment, the audio transmitting device 1200 can be a speaker, and the audio receiving device 1400 can be a microphone, though the disclosure is not limited thereto. Any element capable of sending sound and receiving sound can be used as the audio transmitting device 1200 and the audio receiving device 1400 of the disclosure.

In the present embodiment, the signal processing device 1600 and the decision device 1800 can be hardware, firmware, or software or machine executable program codes stored in a memory and loaded and executed by a processor or microprocessor. If hardware or circuits are adopted for implementation, each of the signal processing device 1600 and the decision device 1800 can be implemented by a circuit chip, or can be partially or entirely implemented by a single integrated circuit chip, though the disclosure is not limited thereto. The aforementioned memory can be an optical disk, a random access memory (RAM), a read only memory (ROM), a flash memory, a floppy disk, a hard disk or a magnetic optical disk, or a remote recording medium or a none-temporary machine readable medium that can be accessed through a network. The aforementioned hardware is, for example, implemented by a general computer, an application specific integrated circuit (ASIC) or a field programmable gate array (FPGA). When the aforementioned hardware accesses and executes the aforementioned software or machine executable program codes, the hardware may include a memory device. The memory device is, for example, a RAM, a ROM, a flash memory, a thumb disk, etc., which is used for storing the aforementioned software or the machine executable program codes.

Besides, in an embodiment of the disclosure, the space where the space status detection apparatus 1000 is installed can be an indoor space, and the acoustic signal AS_T sent by the audio transmitting device 1200 can be an impulse, and the varied acoustic signal AS_R received by the audio receiving device 1400 can be an impulse response of the impulse in the space, though the disclosure is not limited thereto. It should be noticed that the acoustic signal AS_T sent by the audio transmitting device 1200 can be an audible sound wave, where a frequency range of the audible sound wave is about 20 Hz-20 kHz, though the disclosure is not limited thereto. In another embodiment, the acoustic signal AS_T sent by the audio transmitting device 1200 can be an ultrasonic wave with a frequency more than 20 kHz or an infrasonic wave with a frequency lower than 20 Hz.

Moreover, in an embodiment of the disclosure, the audio transmitting device 1200 can periodically or non-periodically (for example, randomly) transmit the acoustic signal AS_T into the space, and the signal processing device 1600 can generate the corresponding space status characteristic parameter SSCP.

Further, the space status detection apparatus 1000 can be installed in an indoor space. In an initial stage, the space status detection apparatus 1000 sets the audio transmitting device 1200 to transmit the impulse AS_T into the indoor space. Then, the audio receiving device 1400 receives the impulse response AS_R in the indoor space to serve as the audio sensing signal AS. Thereafter, the signal processing device 1600 generates the space status characteristic parameter SSCP of the initial stage according to a characteristic of the audio sensing signal AS. In a detection stage, the space status detection apparatus 1000 sets the audio transmitting device 1200 to periodically or non-periodically (for example, randomly) transmit the impulse AS_T into the indoor space, though the disclosure is not limited thereto. The audio transmitting device 1200 can also be triggered through other sensing mechanism to transmit the impulse AS_T (acoustic signal), for example, triggered through an infrared manner. The audio receiving device 1400 can receive the corresponding impulse response AS_R to serve as the audio sensing signal AS. The signal processing device 1600 generates the corresponding space status characteristic parameter SSCP according to the audio sensing signal AS. The decision device 1800 compares the corresponding space status characteristic parameter SSCP with the space status characteristic parameter SSCP of the initial stage to detect whether the space status of the space is changed between the initial stage and the detection stage.

Figure 2A:
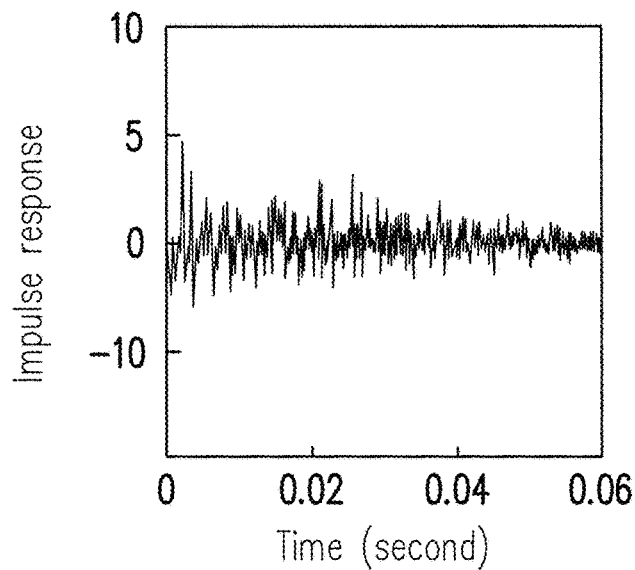
FIG. 2A illustrates an impulse response in a small room according to an embodiment of the disclosure.
Figure 2B:
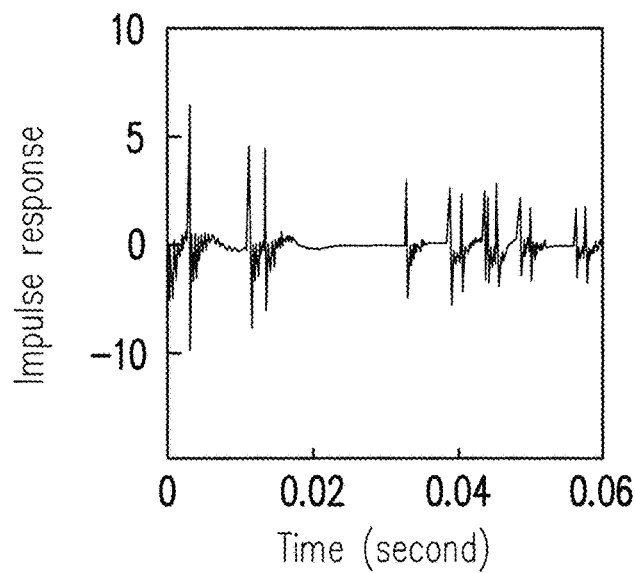
FIG. 2B illustrates an impulse response in a large room according to an embodiment of the disclosure.
Figure 2C:
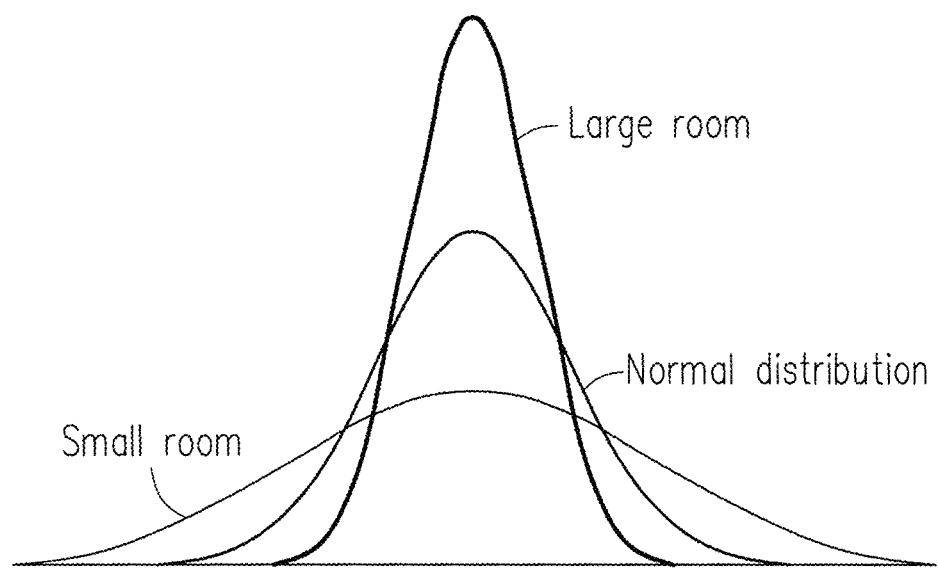
FIG. 2C is a peak comparison diagram of impulse amplitude distributions in rooms of different sizes according to an embodiment of the disclosure.
Figure 2D:
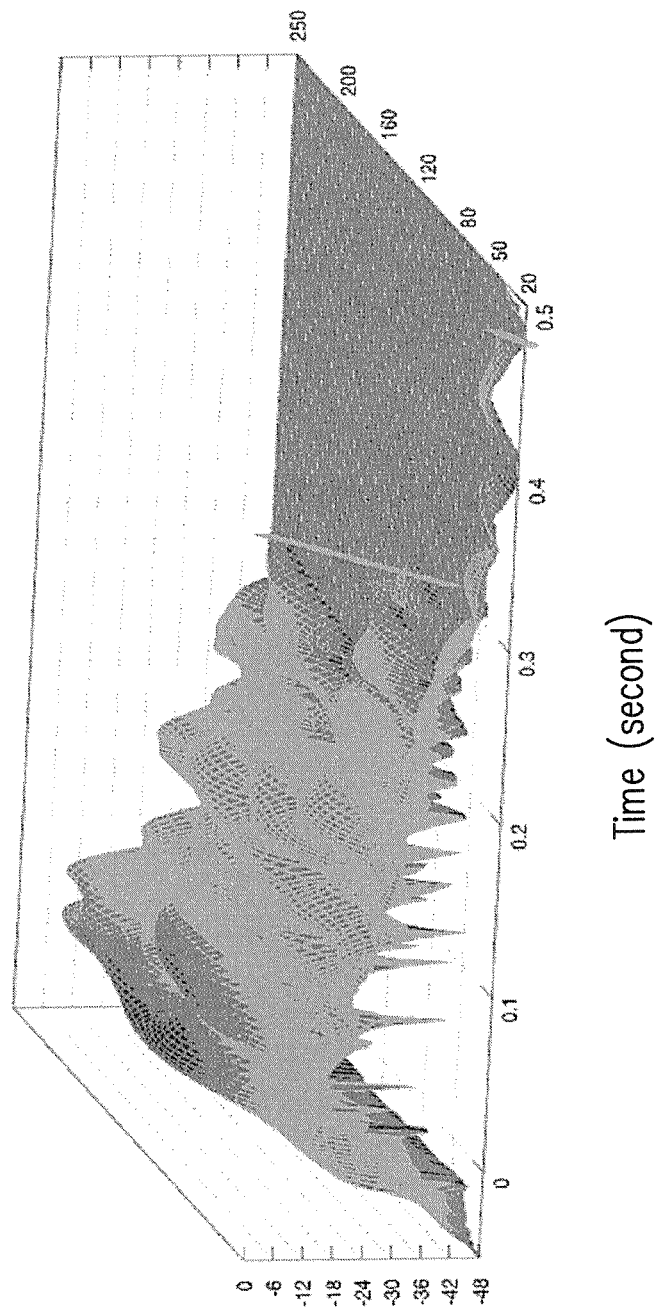
FIG. 2D is an energy spectrum diagram of impulse response in an empty room according to an embodiment of the disclosure.
Figure 2E:
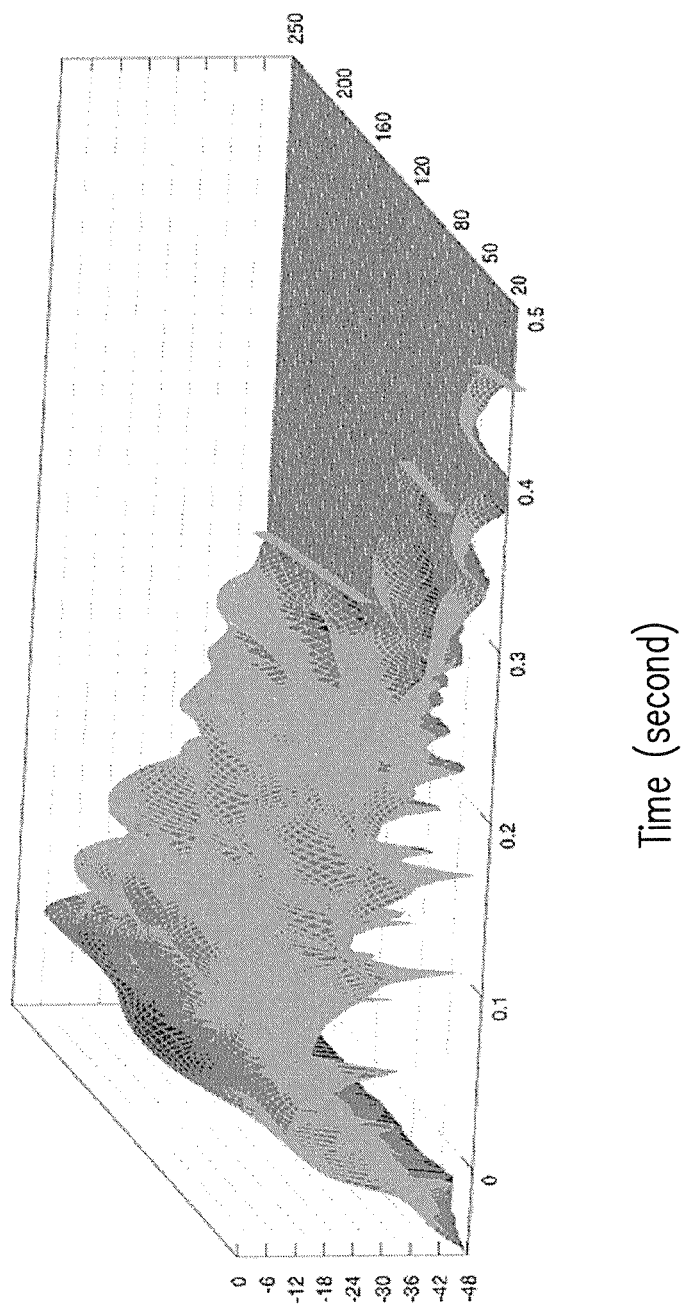
FIG. 2E is an energy spectrum diagram of impulse response in a room arranged with articles according to an embodiment of the disclosure.

It should be noticed that the impulse response of the impulse in the indoor space is varied along with a size of the indoor space and different arrangements, as shown in FIG. 2A-FIG. 2E. FIG. 2A illustrates an impulse response in a small room according to an embodiment of the disclosure. FIG. 2B illustrates an impulse response in a large room according to an embodiment of the disclosure. FIG. 2C is a peak comparison diagram of impulse amplitude distributions in rooms with different sizes according to an embodiment of the disclosure. FIG. 2D is an energy spectrum diagram of impulse response in an empty room according to an embodiment of the disclosure. FIG. 2E is an energy spectrum diagram of impulse response in a room arranged with articles according to an embodiment of the disclosure. According to FIG. 2A-FIG. 2E, it is known that the impulse response of the impulse in the indoor space is different along with the size of the indoor space and variation of the article arrangement therein. Therefore, when the space status detection apparatus 1000 is re-installed in another indoor space, the space status detection apparatus 1000 would re-obtain the space status characteristic parameter SSCP of the initial stage in the indoor space, so as to avoid misjudge of the space status detection apparatus 1000 in the detection stage.

It should be noticed that the varied acoustic signal AS_R received by the audio receiving device 1400 can be represented by a model, and the model can be a transform of the acoustic signal AS_T transmitted by the audio transmitting device 1200 in the indoor space. In other words, the varied acoustic signal AS_R received by the audio receiving device 1400 can be presented by an equation (1):

$$y[n]=T\{x[n]\} \qquad (1)$$

Where, x[n] is the acoustic signal AS_T transmitted by the audio transmitting device 1200, and y[n] is the varied acoustic signal AS_R received by the audio receiving device 1400. If a linear time-invariant system is used to describe the transform in the indoor space, the equation (1) can be represented by an equation (2):

$$y[n]=T\{x[n]\}=h[n]*x[n] \qquad (2)$$

Where, h[n] is a response of the indoor space in time domain, and * represents a convolution operation. By performing a Fourier transform to the equation (2), an equation (3) is obtained:

$$Y(\omega)=H(\omega)\times X(\omega) \qquad (3)$$

Where, ω represents frequency. When x[n] is the impulse (i.e. δ[n]), the frequency response X(ω) thereof is equal to 1, and the equation (3) can be represented by an equation (4):

$$Y(\omega)=H(\omega)\times X(\omega)=H(\omega) \qquad (4)$$

Namely, the frequency response Y(ω) of the varied acoustic signal AS_R received by the audio receiving device 1400 is the frequency response H(ω) of the indoor space. In other words, the varied acoustic signal AS_R received by the audio receiving device 1400 is the characteristic of the indoor space.

In the aforementioned embodiment, although the space status detection apparatus 1000 is disposed in the indoor space, the audio transmitting device 1200 is configured to transmit an impulse, and the audio receiving device 1400 is configured to receive the impulse response AS_R in the indoor space to serve as the audio sensing signal AS, the disclosure is not limited thereto. In other words, the space status detection apparatus 1000 can be disposed in an outdoor space, the audio transmitting device 1200 is configured to transmit any type of the acoustic signal AS_T, and the audio receiving device 1400 is configured to receive the varied acoustic signal AS_R of the acoustic signal AS_T in the outdoor space to serve as the audio sensing signal AS. Namely, configuration of the space status detection apparatus 1000 can be determined according to an actual design/application requirement.

Figure 3:
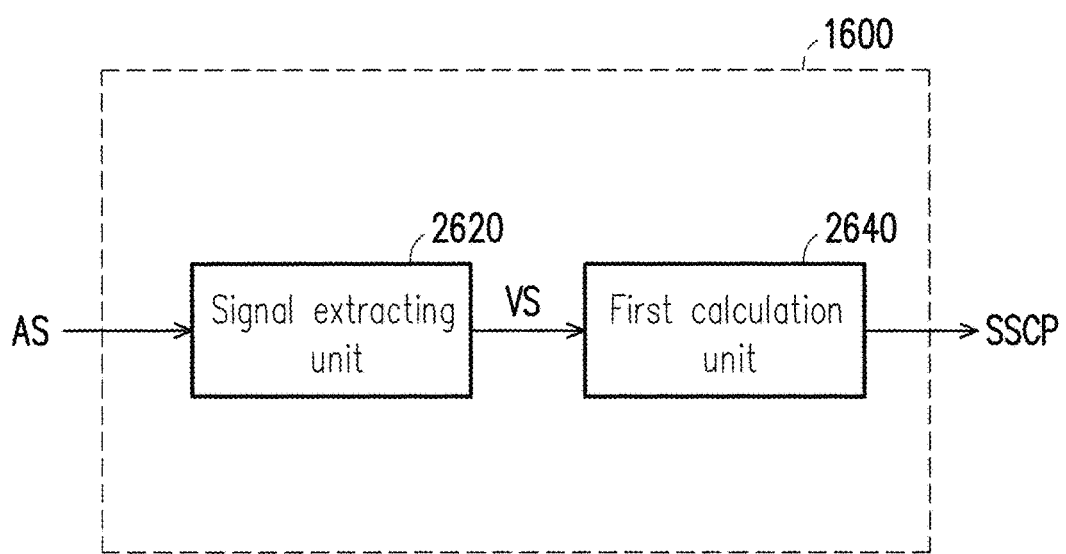
FIG. 3 is a block schematic diagram of a signal processing device of the embodiment of FIG. 1 according to an embodiment of the disclosure.

Referring to FIG. 3, FIG. 3 is a block schematic diagram of a signal processing device 1600 of the embodiment of FIG. 1 according to an embodiment of the disclosure. The signal processing device 1600 includes a signal extracting unit 2620 and a first calculation unit 2640. The signal extracting unit 2620 receives the audio sensing signal AS and extracts a valid signal VS in the audio sensing signal AS. The first calculation unit 2640 receives the valid signal VS from the signal extracting unit 2620, and calculates the space status characteristic parameter SSCP according to the valid signal VS.

Figure 4:
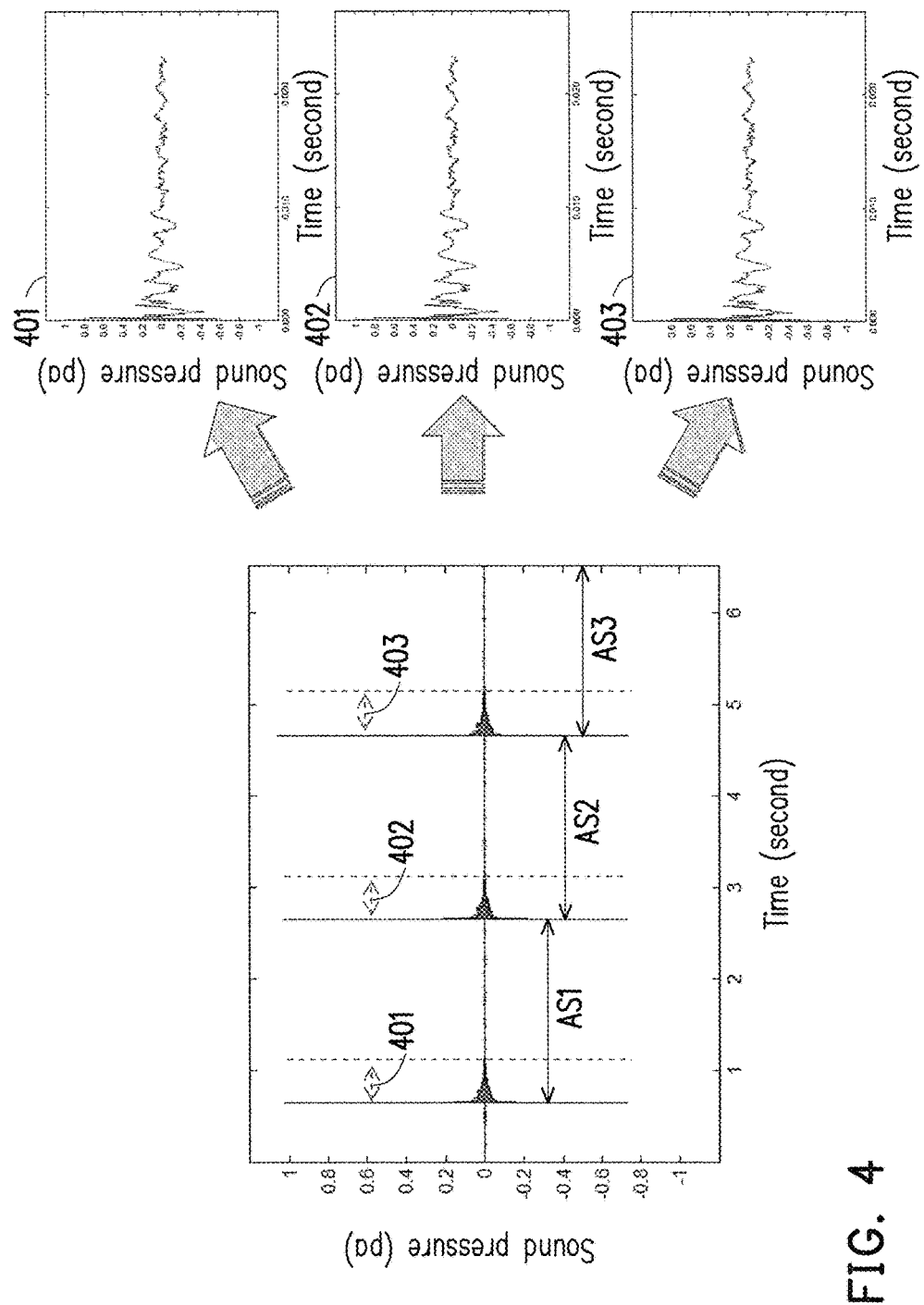
FIG. 4 is a schematic diagram of signal extraction of an impulse response according to an embodiment of the disclosure.

In an embodiment, in order to reduce a signal processing amount of the first calculation unit 2640, the signal extracting unit 2620 may extract a section of the audio sensing signal AS having the acoustic signal variation. To facilitate description, the impulse response of the indoor space is taken as an example for description, though the disclosure is not limited thereto. Referring to FIG. 1, FIG. 3 and FIG. 4, FIG. 4 is a schematic diagram of signal extraction of the impulse response according to an embodiment of the disclosure. As shown in FIG. 4, the signal processing device 1600 receives three audio sensing signals AS1, AS2 and AS3 within 6 seconds. However, sections 401, 402 and 403 having the acoustic signal variation in the three audio sensing signals AS1, AS2 and AS3 are only maintained by 25 ms, respectively. Therefore, the signal extracting unit 2620 can extract the audio sensing signals in the sections 401, 402 and 403, and provide the audio sensing signals in the sections 401, 402 and 403 to the first calculation unit 2640 to calculate the space status characteristic parameters SSCP. In this way, the signal processing amount of the first calculation unit 2640 is decreased.

In the embodiment of FIG. 4, the signal processing device 1600 receives the three audio sensing signals AS1, AS2 and AS3 within 6 seconds, and the sections 401, 402 and 403 having the acoustic signal variation in the three audio sensing signals AS1, AS2 and AS3 are maintained by 25 ms respectively, though the disclosure is not limited thereto. Namely, the section having the acoustic signal variation in each audio sensing signal (for example, the audio sensing signal AS1) can be maintained shorter, and can also be maintained till a next audio sensing signal (for example, the audio sensing signal AS2) is received. A length of the section having the acoustic signal variation in each audio sensing signal can be varied along with the space where the space status detection apparatus 1000 is disposed. An interval that the signal processing device 1600 receives each of the audio sensing signals (i.e. an interval that the audio transmitting device 1200 transmits each acoustic signal) can be determined according to an actual design requirement.

Figure 5:
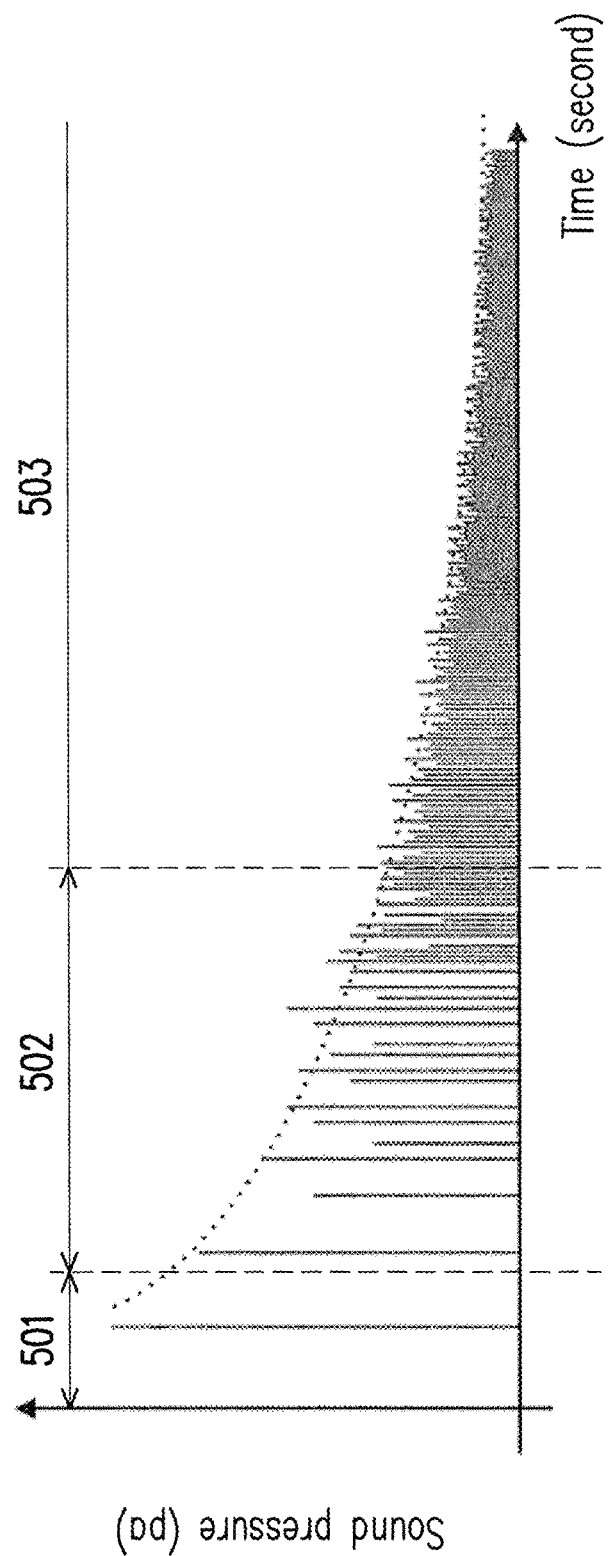
FIG. 5 is an impulse response diagram of an indoor space according to an embodiment of the disclosure.

In an embodiment of the disclosure, the audio sensing signal AS received by the signal extracting unit 2620 may include a direction sound section and a reflection section, where the direct sound section represents the signal without being reflected in the space, and the reflection section may include early reflections and reverberations. For simplicity's sake, the impulse response of the indoor space is taken as an example for description, though the disclosure is not limited thereto. Referring to FIG. 5, FIG. 5 is an impulse response diagram of an indoor space according to an embodiment of the disclosure. The response signal in a region 501 can be regarded as a direct impulse without being reflected in the indoor space, which has a maximum sound pressure. A region 502 can be regarded as the impulse of early reflections in the indoor space, and since the impulse may have energy loss during the reflection, the sound pressure thereof is smaller than that of the direct impulse. A region 503 can be regarded as the impulse of reverberations in the indoor space, and the sound pressure thereof is further decreased along with time increase.

Since the direct sound is not reflected in the space, the direct sound generally does not include information of the space status. In an embodiment of the disclosure, the signal extracting unit 2620 can filter the direct sound in the audio sensing signal AS, though the disclosure is not limited thereto. In other embodiments of the disclosure, the signal extracting unit 2620 can also filter the reflection sound in the audio sensing signal AS, which is determined according to an actual design/application requirement.

Figure 6:
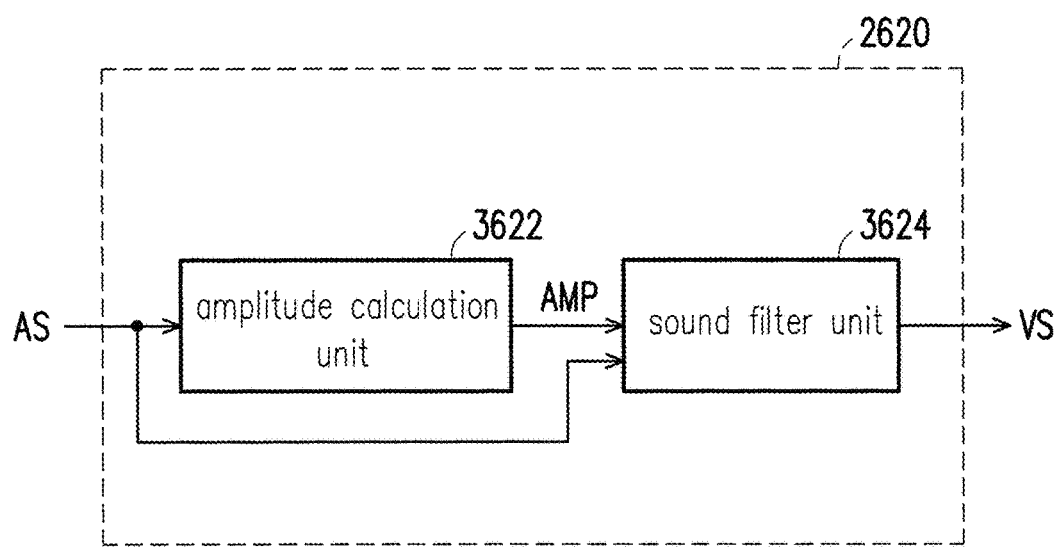
FIG. 6 is a block schematic diagram of a signal extracting unit of the embodiment of FIG. 3 according to an embodiment of the disclosure.

Referring to FIG. 6, FIG. 6 is a block schematic diagram of the signal extracting unit 2620 of the embodiment of FIG. 3 according to an embodiment of the disclosure. The signal extracting unit 2620 includes an amplitude calculation unit 3622 and a sound filter unit 3624. The amplitude calculation unit 3622 receives the audio sensing signal AS to calculate an average amplitude of the audio sensing signal AS, and outputs an average amplitude value AMP. The sound filter unit 3624 receives the audio sensing signal AS, and is coupled to the amplitude calculation unit 3622 to receive the average amplitude value AMP, and filters the audio sensing signal AS according to the average amplitude value AMP to generate the valid signal VS.

In the embodiment of FIG. 6, the sound filter unit 3624 can be used to filter the direct sound section in the audio sensing signal AS. The sound filter unit 3624 determines whether the amplitude of the audio sensing signal AS keeps being smaller than the average amplitude value AMP by a predetermined time T, and if the determination result is affirmative, the sound filter unit 3624 outputs the audio sensing signal after the predetermined time T to serve as the valid signal VS, and otherwise filters the audio sensing signal before the predetermined time T, though the disclosure is not limited thereto. Namely, the sound filter unit 3624 can also filter the reflection section in the audio sensing signal AS. The sound filter unit 3624 determines whether the amplitude of the audio sensing signal AS keeps being smaller than the average amplitude value AMP by the predetermined time T, and if the determination result is affirmative, the sound filter unit 3624 filters the audio sensing signal after the predetermined time T, and otherwise outputs the audio sensing signal before the predetermined time T to serve as the valid signal VS.

Figure 7:
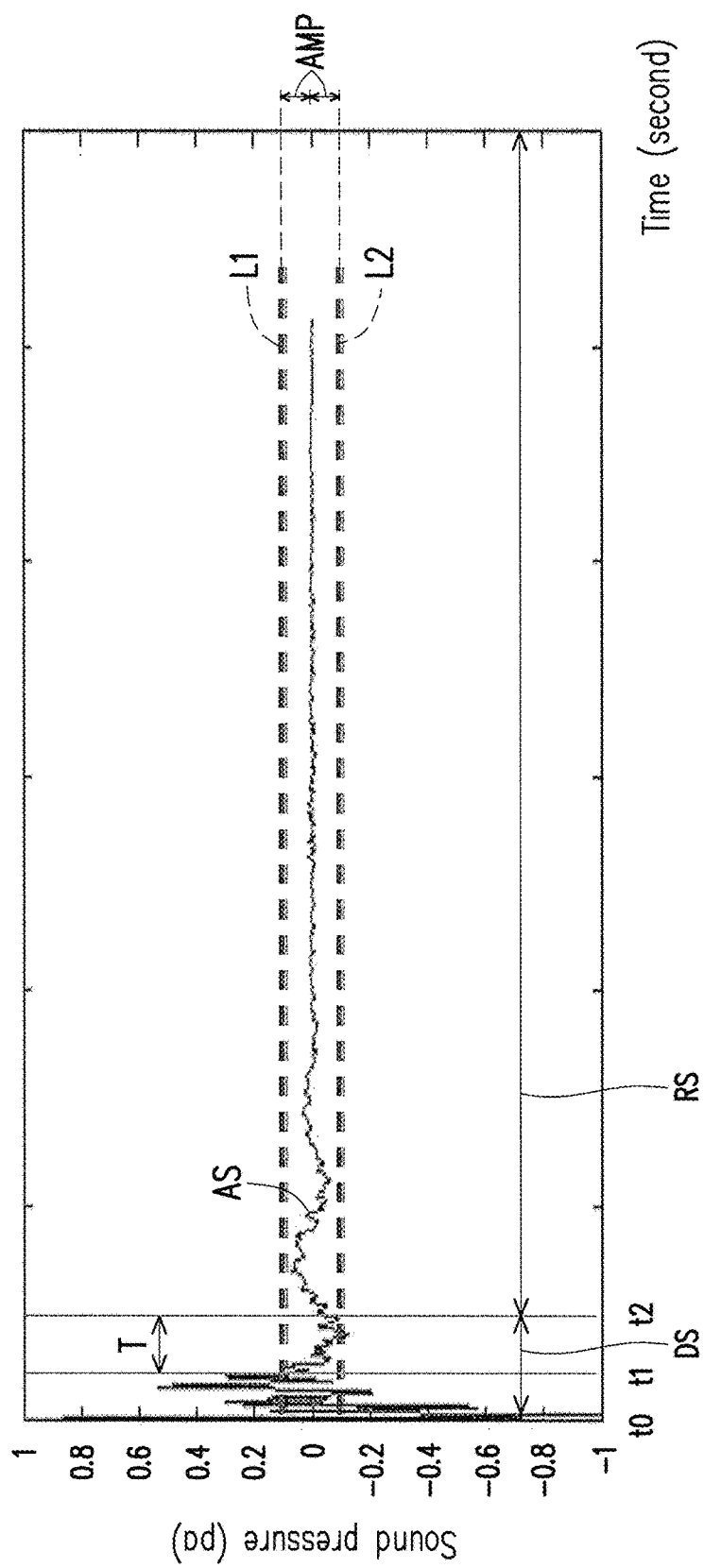
FIG. 7 is an impulse response diagram according to an embodiment of the disclosure.

To facilitate description, the impulse response of the indoor space is taken as an example for description, though the disclosure is not limited thereto. Referring to FIG. 6 and FIG. 7, FIG. 7 is an impulse response diagram according to an embodiment of the disclosure. The amplitude calculation unit 3622 calculates the average amplitude value AMP of the received audio sensing signal AS, which is shown by dot lines L1 and L2 in FIG. 7, where the dot line L1 represents a positive value of the average amplitude value AMP, and the dot line L2 represents a negative value of the average amplitude value AMP. Since an absolute value of the amplitude value of the audio sensing signal AS between a time point t0 and a time point t1 is greater than the average amplitude value AMP, the sound filter unit 3624 determines the audio sensing signal AS within such time interval to be the direct sound section DS. After the time point t1, the absolute value of the amplitude value of the audio sensing signal AS keeps being smaller than the average amplitude value AMP. Until a time point t2, the absolute value of the amplitude value of the audio sensing signal AS has kept being smaller than the average amplitude value AMP by the predetermined time T, and the sound filter unit 3624 determines the audio sensing signal after the time point t2 to be the reflection section RS, and determines the audio sensing signal before the time point t2 to be the direct sound section DS. In this way, the sound filter unit 3624 can determine to output the direct sound section DS or the reflection section RS to serve as the valid signal VS according to an actual design/application requirement.

Referring back to FIG. 3, the first calculation unit 2640 shown in FIG. 3 can generate at least one characteristic parameter according to the valid signal VS, and outputs the space status characteristic parameter SSCP. The space status characteristic parameter SSCP may include the at least one parameter or a statistic amount of the at least one parameter, though the disclosure is not limited thereto.

In an embodiment of the disclosure, the at least one characteristic parameter generated by the first calculation unit 2640 may include frequency domain characteristic parameters or time domain characteristic parameters. The first calculation unit 2640 may calculate an expectation value or a standard deviation of the frequency domain characteristic parameters or calculate an expectation value or a standard deviation of the time domain characteristic parameters. The first calculation unit 2640 takes the expectation value or the standard deviation of the frequency domain characteristic parameters or the expectation value or the standard deviation of the time domain characteristic parameters as the statistic amount of the at least one parameter. The first calculation unit 2640 can merge the expectation value and the standard deviation of the frequency domain characteristic parameters to serve as the statistic amount of the at least one characteristic parameter. The first calculation unit 2640 can also merge the expectation value and the standard deviation of the time domain characteristic parameters to serve as the statistic amount of the at least one characteristic parameter. Alternatively, the first calculation unit 2640 can also merge the expectation value and the standard deviation of the time domain characteristic parameters and the expectation value and the standard deviation of the frequency domain characteristic parameters to serve as the statistic amount of the at least one characteristic parameter, though the disclosure is not limited thereto.

Figure 8A:
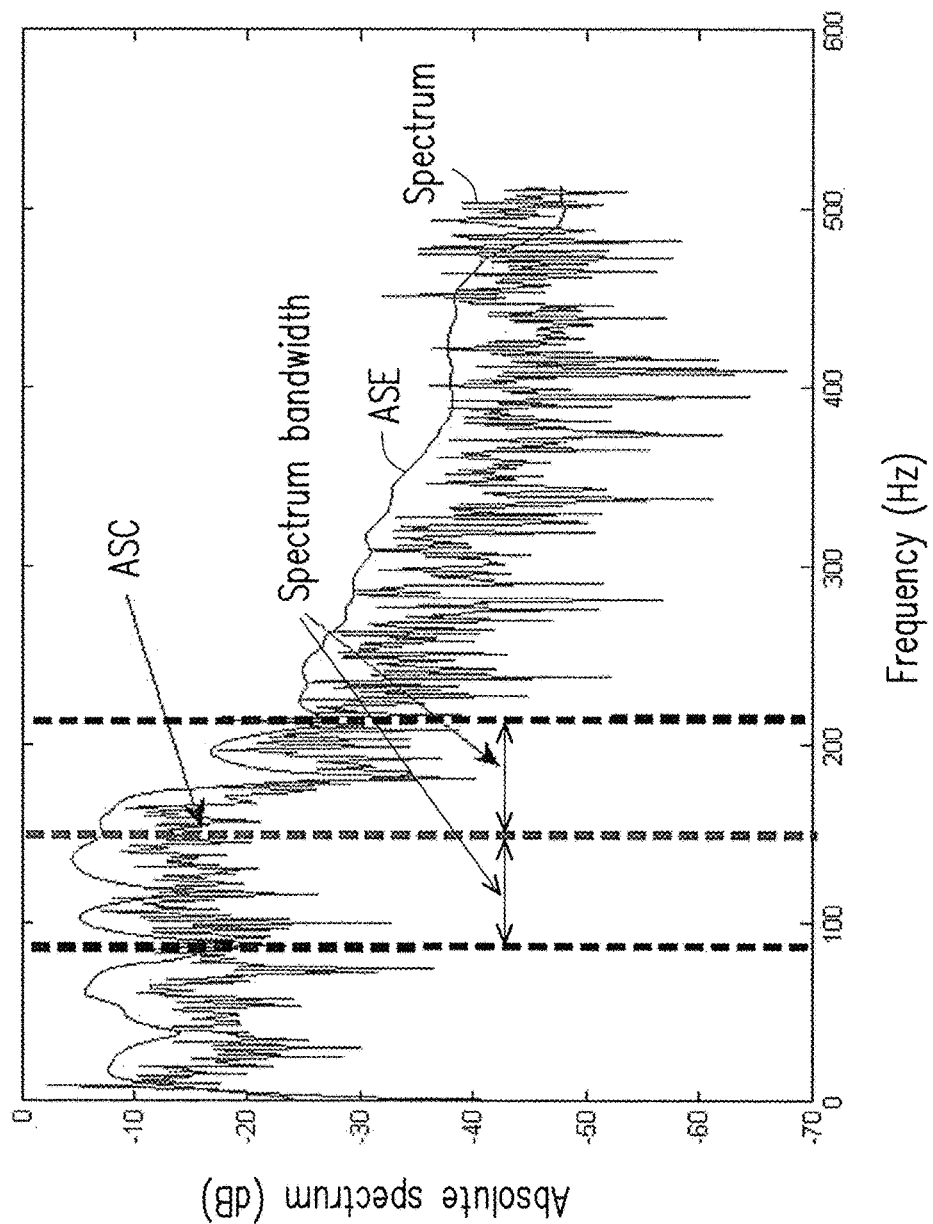
FIG. 8A is a schematic diagram of frequency domain characteristic of a valid signal according to an embodiment of the disclosure.

The frequency domain characteristic parameters can be used to obtain a spectrum characteristic of the valid signal VS by using MPEG7 spectral descriptors, as shown in FIG. 8A. FIG. 8A is a schematic diagram of frequency domain characteristic of the valid signal VS according to an embodiment of the disclosure. The spectrum characteristic may include audio spectrum envelop (ASE), audio spectrum centroid (ASC), audio spectrum spread (ASS), audio spectrum flatness (ASF) or audio spectrum bandwidth. The ASE is to describe the original signal through a log-frequency, by which a data amount of the original signal can be decreased. The ASC can represent a shape of a power spectrum, which can be used to determine whether the power spectrum is mainly composed of a high frequency signal or a low frequency signal. The ASS can represent a shape of the spectrum, which can be used to represent a distribution of the spectrum around the centroid. A low value of the ASS represents that the spectrum is focused at the centroid, and a high value of the ASS represents that the spectrum is spread. The ASF represents a flatness of the power spectrum, which can be used to determine whether a signal is an interference caused by noise. The high value of the ASF represents that the signal is noise, and otherwise the signal is regarded to have a harmonic structure.

Figure 8B:
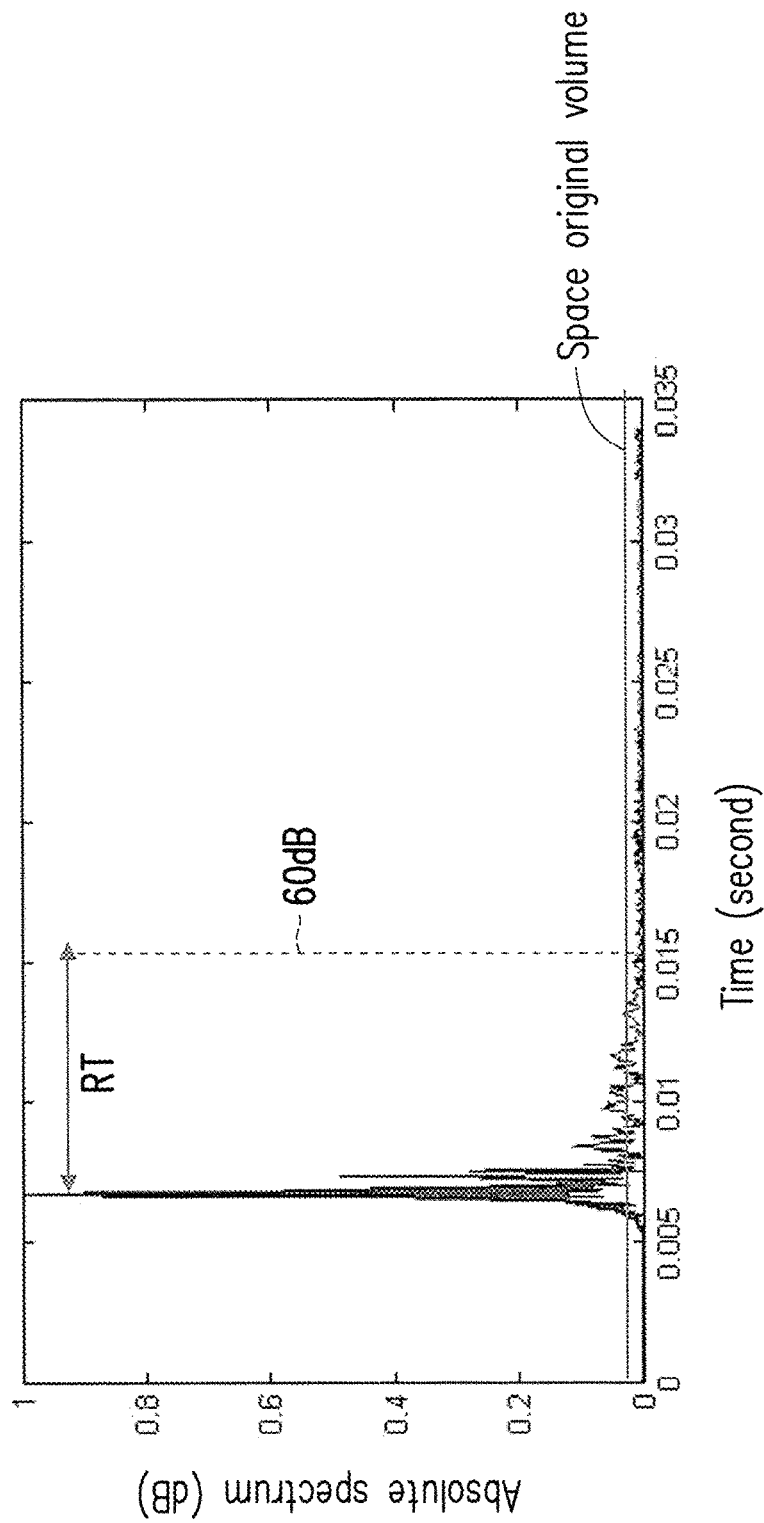
FIG. 8B is a schematic diagram of time domain characteristic of a valid signal according to an embodiment of the disclosure

The time domain characteristic parameters may include partial energy of the amplitude of the valid signal VS, peak statistic of the amplitude of the valid signal VS or a reverberation time (RT) of the space, as shown in FIG. 8B. FIG. 8B is a schematic diagram of time domain characteristic of the valid signal VS according to an embodiment of the disclosure. FIG. 8B illustrates the partial energy of the amplitude of the valid signal VS and the reverberation time RT of the space, where the reverberation time RT represents a time required for attenuation of the stable sound pressure by 60 dB. The time domain characteristic parameters can effectively reflect information such as a volume of the space and a wall reflection distance, etc.

Calculation method of the space status characteristic parameter SSCP of the initial stage and the detection stage is described below.

Figure 9A:
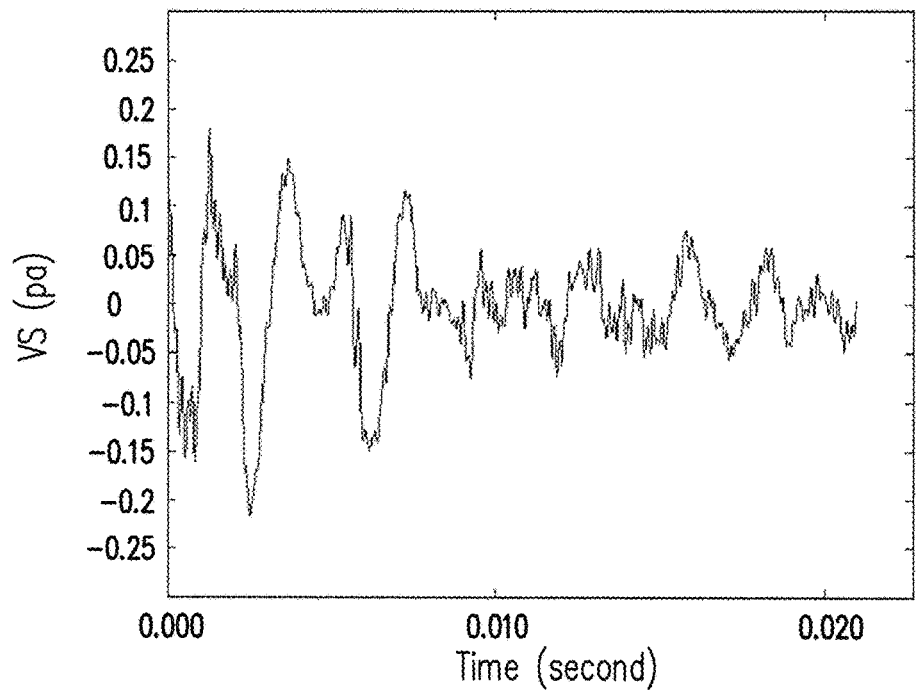
FIG. 9A-FIG. 9C are flow schematic diagrams of space status characteristic parameters in an initial stage according to an embodiment of the disclosure.
Figure 9B:
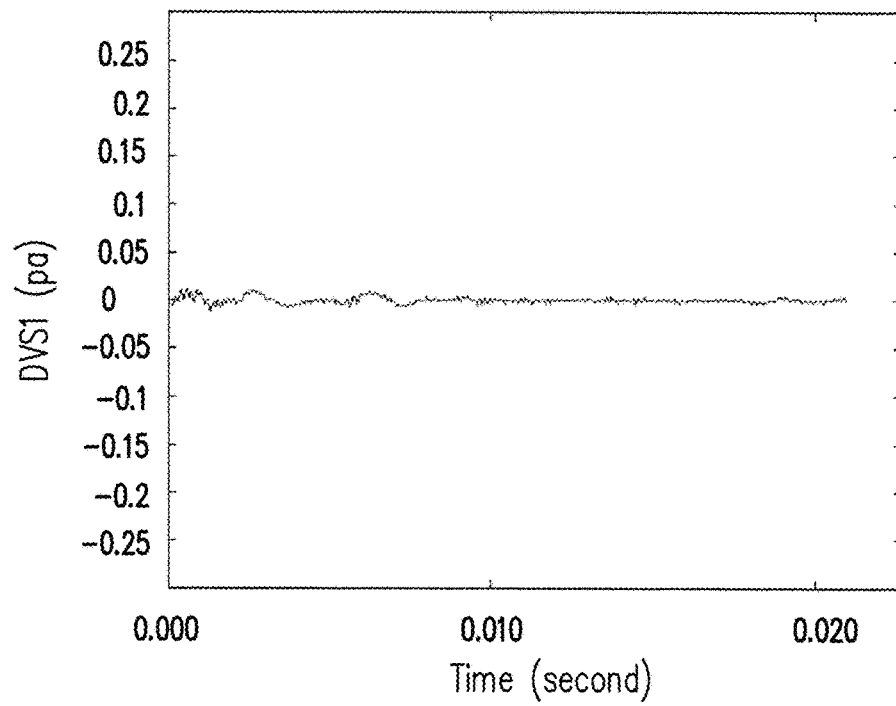
Figure 9C:
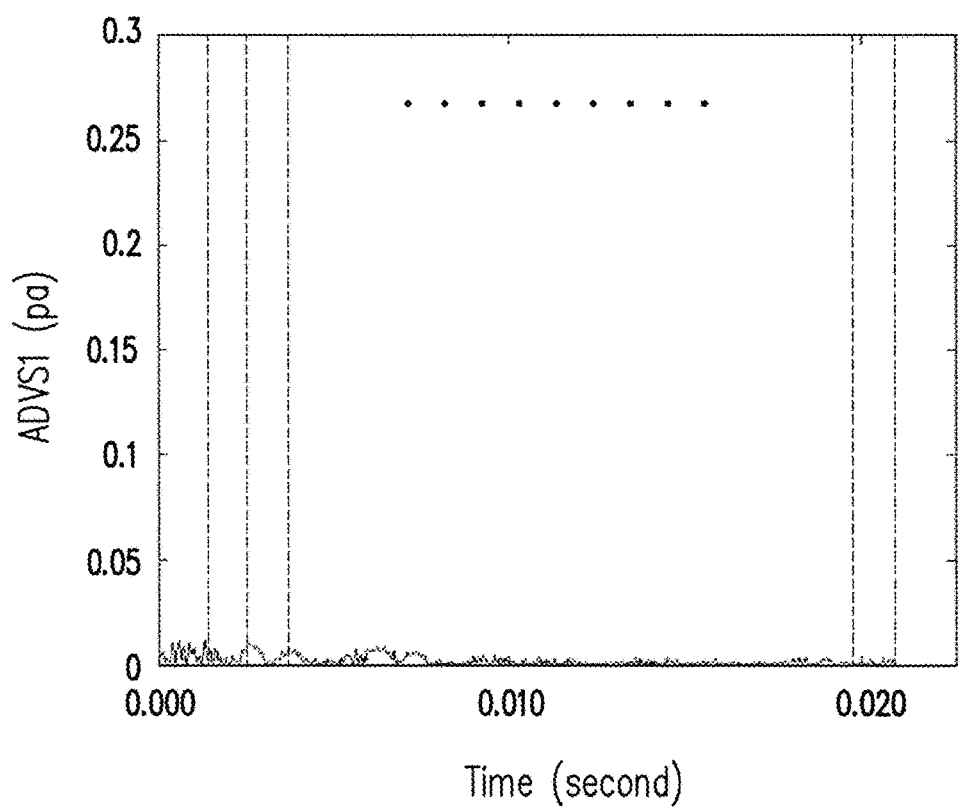

Referring to FIG. 3 and FIG. 9A-FIG. 9C, FIG. 9A-FIG. 9C are flow schematic diagrams of the space status characteristic parameters in the initial stage according to an embodiment of the disclosure. First, in the initial stage, the first calculation unit 2640 receives the valid signal VS, as shown in FIG. 9A. The valid signal VS can be an impulse response, though the disclosure is not limited thereto. Then, the first calculation unit 2640 calculates an average amplitude value AMP_INI of the valid signal VS in the initial stage, and subtracts the amplitude of the valid signal VS by the average amplitude value AMP_INI of the initial stage to produce a first difference signal DVS1 shown in FIG. 9B. Then, the first calculation unit 2640 obtains an absolute value of the first difference signal DVS1 to generate a first absolute difference signal ADVS1, and divides the first absolute difference signal ADVS1 into a plurality of frames to calculate a partial energy value of each frame, as shown in FIG. 9C. Finally, the partial energy values are computed to obtain the space status characteristic parameter of the initial stage.

Figure 10A:
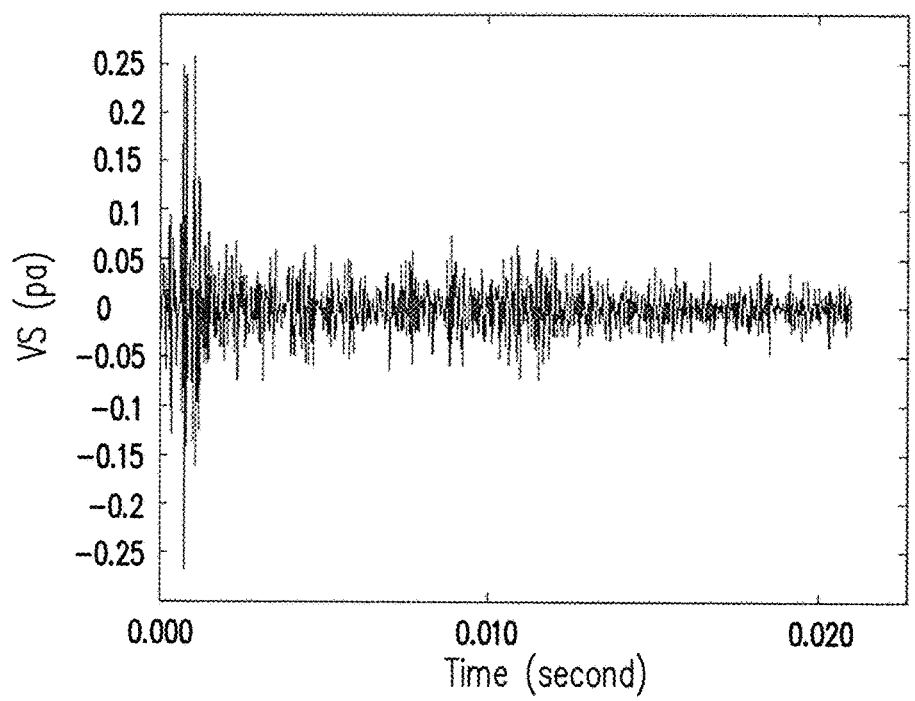
FIG. 10A-FIG. 10C are flow schematic diagrams of space status characteristic parameters in a detection stage according to an embodiment of the disclosure.
Figure 10B:
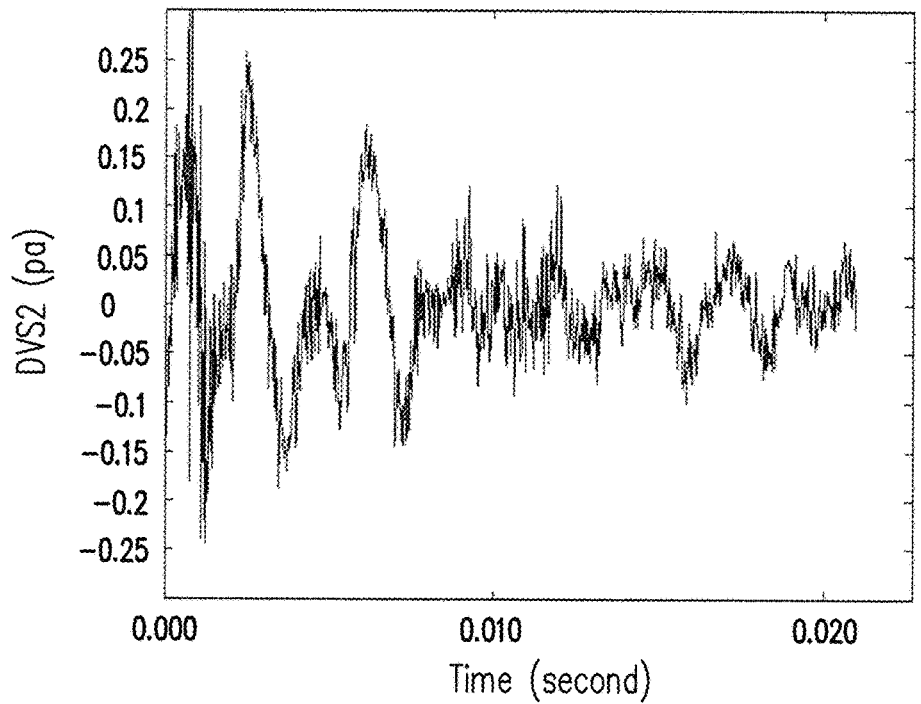
Figure 10C:
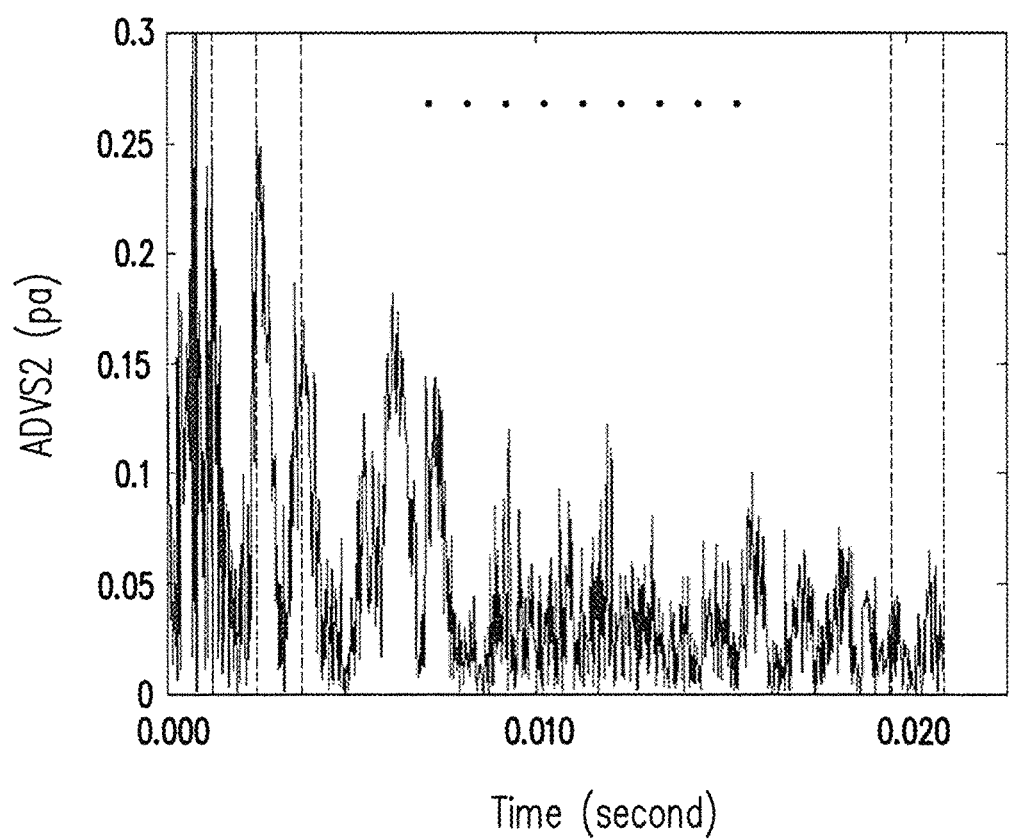

Referring to FIG. 3 and FIG. 10A-FIG. 10C, FIG. 10A-FIG. 10C are flow schematic diagrams of the space status characteristic parameters in the detection stage according to an embodiment of the disclosure. First, in the detection stage, the first calculation unit 2640 receives the valid signal VS, as shown in FIG. 10A. The valid signal VS can be an impulse response, though the disclosure is not limited thereto. Then, the first calculation unit 2640 subtracts the amplitude of the valid signal VS by the average amplitude value AMP_INI of the initial stage to produce a second difference signal DVS2 shown in FIG. 10B. Then, the first calculation unit 2640 obtains an absolute value of the second difference signal DVS2 to generate a second absolute difference signal ADVS2, and divides the second absolute difference signal ADVS2 into a plurality of frames to calculate a partial energy value of each frame, as shown in FIG. 10C. Finally, the partial energy values are computed to obtain the space status characteristic parameter of the detection stage.

Figure 11:
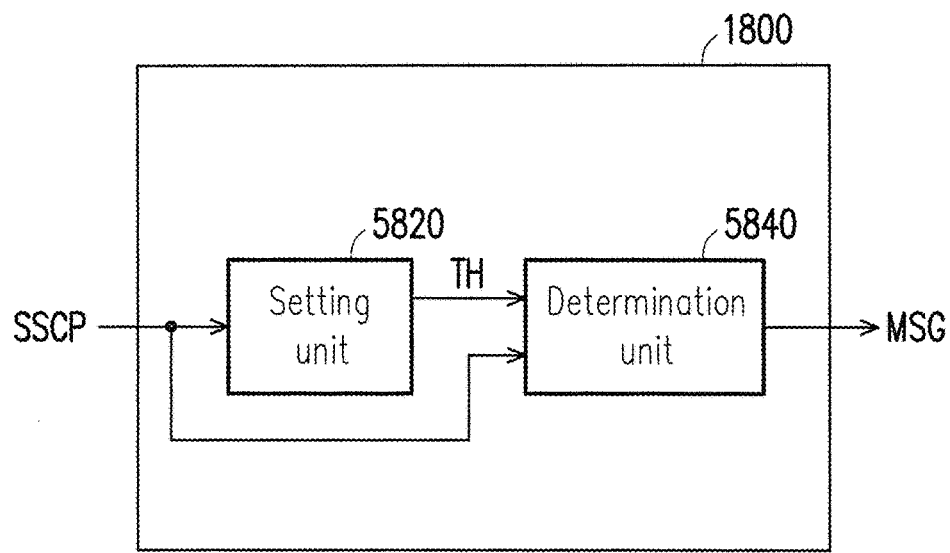
FIG. 11 is a block schematic diagram of a decision device of the embodiment of FIG. 1.

Referring to FIG. 1 and FIG. 11, FIG. 11 is a block schematic diagram of the decision device 1800 of the embodiment of FIG. 1. The space status detection apparatus 1000 may include an initial mode and a detection mode. The decision device 1800 includes a setting unit 5820 and a determination unit 5840. When the space status detection apparatus 1000 is operated in the initial mode, the setting unit 5820 receives the space status characteristic parameter SSCP corresponding to the initial mode, and determines a threshold TH according to the space status characteristic parameter SSCP. The determination unit 5840 is coupled to the setting unit 5820 to receive the threshold TH. When the space status detection apparatus 1000 is operated in the detection mode, the determination unit 5840 receives the space status characteristic parameter SSCP corresponding to the detection mode, and determines whether the space status is changed according to the threshold TH and the space status characteristic parameter SSCP corresponding to the detection mode, and accordingly generates a message MSG.

For example, when the space status detection apparatus 1000 is operated in the initial mode (i.e. the aforementioned initial stage), the setting unit 5820 calculates an expectation value and a standard deviation of the frame partial energy value of the first absolute difference signal ADVS1, and sets the threshold TH as a sum of the expectation value and twice of the standard deviation, where the expectation value is, for example, an average of the frame partial energy value. When the space status detection apparatus 1000 is operated in the detection mode (i.e. the aforementioned detection stage), the setting unit 5820 calculates an expectation value of the frame partial energy value of the second absolute difference signal ADVS2, and compares the expectation value with the threshold TH. If the expectation value of the frame partial energy value of the second absolute difference signal ADVS2 is greater than the threshold TH, it represents that the space status is changed, and otherwise represents that the space status is in a normal status. However, the disclosure is not limited thereto.

Besides, in a plurality of embodiments of the disclosure, the setting unit 5820 can also set the threshold TH according to the Z-test or the Euclidean distance. It should be noticed that according to the test result of the present embodiment, to set the threshold TH according to the Euclidean distance can greatly reduce a chance of misjudgment of the space status detection apparatus 1000.

Figure 12:
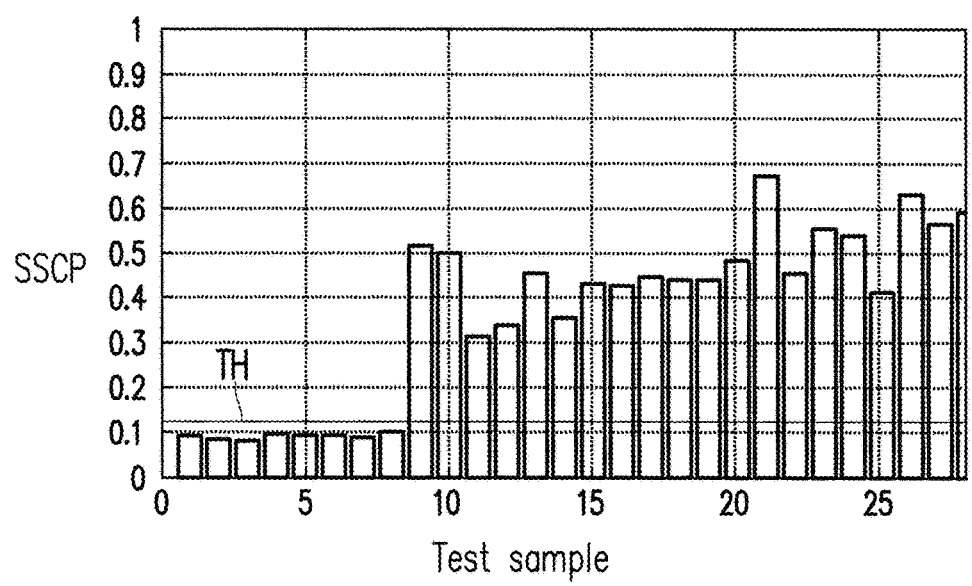
FIG. 12 is a histogram of a space status comparison result according to an embodiment of the disclosure.

Referring to FIG. 1 and FIG. 12, FIG. 12 is a histogram of a space status comparison result according to an embodiment of the disclosure. As shown in FIG. 12, the space status comparison result has 28 test samples, where in the test samples 1-8, the test space is maintained to the initial stage, and in the test samples 9-28, the test space is added with other objects. Values of the space status characteristic parameters SSCP of the test samples 1-8 are all smaller than the threshold TH, such that the space status detection apparatus 1000 determines that the space status of the test samples 1-8 is the normal status. Values of the space status characteristic parameters SSCP of the test samples 9-28 are all greater than the threshold TH, such that the space status detection apparatus 1000 determines that the space status of the test samples 9-28 is an abnormal status, and generates a message MSG for subsequent use.

Figure 13:
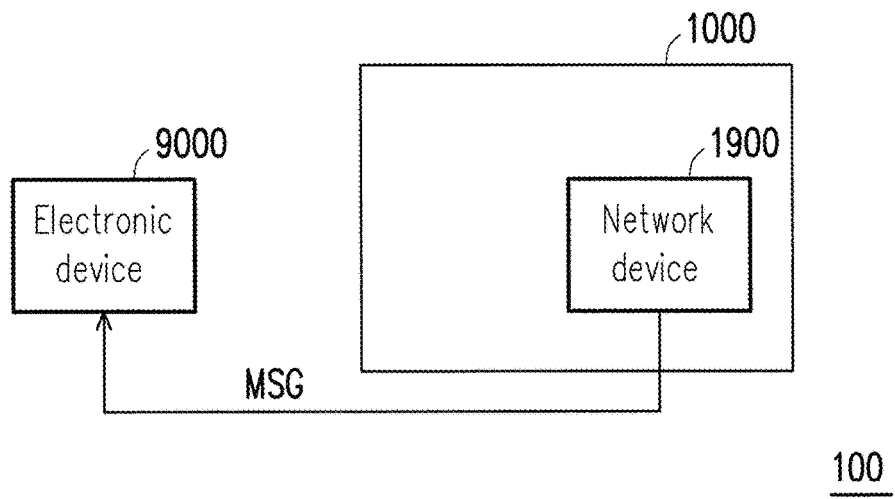
FIG. 13 is a block schematic diagram of a space status detection system based on acoustic signal according to an embodiment of the disclosure.

Referring to FIG. 13, FIG. 13 is a block schematic diagram of a space status detection system 100 based on acoustic signal according to an embodiment of the disclosure. The space status detection system 100 includes an electronic apparatus 9000 and the space status detection apparatus 1000 based on acoustic signal of FIG. 1. The space status detection apparatus 1000 further includes a network device 1900. When the space status detection apparatus 1000 detects that the space status is changed, the space status detection apparatus 1000 sends the message MSG to the electronic apparatus 9000 through the network device 1900.

In the present embodiment, the network device 1900 can communicate with the electronic apparatus 9000. For example, the network device 1900 supports a communication mechanism, for example, Bluetooth, Wi-Fi, global system for mobile communication (GSM), code division multiple access (CDMA), wideband CDMA (WCDMA), CDMA-2000, time division multiple access (TDMA), worldwide interoperability for microwave access (Wi-MAX), long term evolution (LTE), wireless local area network (WLAN) or ultra-wideband (UWB).

In the present embodiment, the electronic apparatus 9000 can be one of a plurality of computer systems or a mobile device, for example, a personal desktop, a workstation, an ultra-mobile PC (UMPC), a net-book, a portable computer, a tablet, a personal digital assistant (PDA), a wireless phone, a mobile phone, a smart phone, etc.

Figure 14:
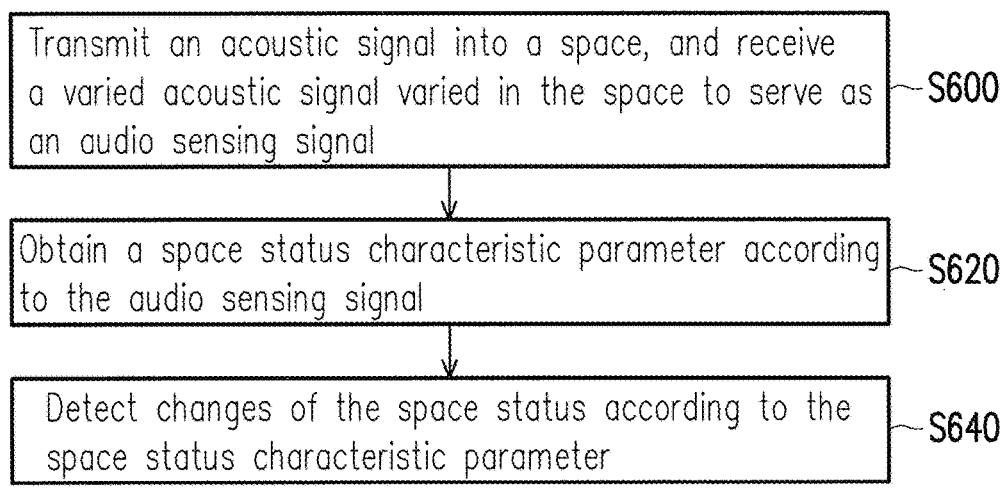
FIG. 14 is a flowchart illustrating a method for space status detection based on acoustic signal according to an embodiment of the disclosure.

Referring to FIG. 14, FIG. 14 is a flowchart illustrating a method for space status detection based on acoustic signal according to an embodiment of the disclosure. The method for space status detection based on acoustic signal includes following steps. First, in step S600, an acoustic signal is transmitted into a space, and a varied acoustic signal which is the transmitted acoustic signal varied in the space is received to serve as an audio sensing signal. Then, in step S620, a space status characteristic parameter is obtained according to the audio sensing signal. Then, in step S640, changes of the space status are detected according to the space status characteristic parameter.

Moreover, those skilled in the art can learn enough instructions and recommendations for the method for space status detection based on acoustic signal from the descriptions of the embodiments of FIG. 1 to FIG. 12, detailed description thereof is not repeated.

In summary, in the apparatus, the system and the method for space status detection based on an acoustic signal, the audio transmitting device transmits the acoustic signal into the space, and the audio receiving device receives the varied acoustic signal which is the transmitted acoustic signal varied in the space to generate the audio sensing signal, accordingly. Then, the space status characteristic parameter is obtained according to the audio sensing signal, and it is detected whether the space status is changed according to the space status characteristic parameter. In the embodiments, since the acoustic signal (for example, impulse) is used as a sensing medium, a general speaker and a microphone can be used as the audio transmitting device and the audio receiving device. In this way, the hardware cost of the space status detection apparatus is reduced. Moreover, since the acoustic signal can be repeatedly reflected in the space (especially an indoor space) before reception, the problems of signal blind angle and signal transceiving directivity are mitigated.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A space status detection apparatus based on acoustic signal, comprising:
   an audio transmitting device, transmitting an acoustic signal into a space;
   an audio receiving device, receiving a varied acoustic signal that is the transmitted acoustic signal varied in the space to serve as a sensing signal, wherein the acoustic signal and the varied acoustic signal are audible sound waves;
   a signal processing device, coupled to the audio receiving device, receiving the sensing signal, and generating a characteristic parameter of a space status according to the sensing signal; and
   a decision device, coupled to the signal processing device, receiving the characteristic parameter, and detecting a change of the space status according to the characteristic parameter.

2. The space status detection apparatus based on acoustic signal as claimed in claim 1, wherein the signal processing device comprises:
   a signal extracting unit, receiving the sensing signal and extracting a valid signal in the sensing signal; and
   a first calculation unit, coupled to the signal extracting unit for receiving the valid signal, and calculating the characteristic parameter according to the valid signal.

3. The space status detection apparatus based on acoustic signal as claimed in claim 2, wherein the sensing signal comprises a direct sound section and a reflection section.

4. The space status detection apparatus based on acoustic signal as claimed in claim 3, wherein the signal extracting unit comprises:
   an amplitude calculation unit, receiving the sensing signal to calculate an average amplitude of the sensing signal, and outputting an average amplitude value; and
   a sound filter unit, coupled to the amplitude calculation unit, the sound filter unit receiving the sensing signal and the average amplitude value, and filtering the sensing signal to generate the valid signal according to the average amplitude value.

5. The space status detection apparatus based on acoustic signal as claimed in claim 4, wherein the sound filter unit filters the direct sound section in the sensing signal,
   wherein the sound filter unit determines whether an amplitude of the sensing signal keeps being smaller than the average amplitude value by a predetermined time and if a determination result is affirmative, the sound filter unit outputs the sensing signal after the predetermined time to serve as the valid signal, and otherwise filters out the sensing signal before the predetermined time.

6. The space status detection apparatus based on acoustic signal as claimed in claim 2, wherein the first calculation unit generates at least one parameter according to the valid signal, and outputs the characteristic parameter of the space status,
   wherein the characteristic parameter of the space status comprises the at least one parameter or a statistic amount of the at least one parameter.

7. The space status detection apparatus based on acoustic signal as claimed in claim 6, wherein the at least one parameter comprises a frequency domain characteristic parameter or a time domain characteristic parameter, wherein the frequency domain characteristic parameter comprises audio spectrum envelop, audio spectrum centroid, audio spectrum spread, or audio spectrum flatness, the time domain characteristic parameter comprises partial energy of an amplitude of the valid signal, peak statistic of the amplitude of the valid signal, or a reverberation time of the space.

8. The space status detection apparatus based on acoustic signal as claimed in claim 7, wherein the first calculation unit generates a first expectation value of the frequency domain characteristic parameter, a first standard deviation of the frequency domain characteristic parameter, a second expectation value of the time domain characteristic parameter, or a second standard deviation of the time domain characteristic parameter, and the first calculation unit outputs the first expectation value of the frequency domain characteristic parameter, the first standard deviation of the frequency domain characteristic parameter, the second expectation value of the time domain characteristic parameter, or the second standard deviation of the time domain characteristic parameter to serve as the statistic amount of the at least one parameter.

9. The space status detection apparatus based on acoustic signal as claimed in claim 7, wherein the first calculation unit generates a first expectation value of the frequency domain characteristic parameter, a first standard deviation of the frequency domain characteristic parameter, a second expectation value of the time domain characteristic parameter, or a second standard deviation of the time domain characteristic parameter, and the first calculation unit merges the first expectation value of the frequency domain characteristic parameter and the first standard deviation of the frequency domain characteristic parameter, or merges the second expectation value of the time domain characteristic parameter and the second standard deviation of the time domain characteristic parameter to serve as the statistic amount of the at least one parameter.

10. The space status detection apparatus based on acoustic signal as claimed in claim 1, wherein the audio transmitting device periodically or randomly transmits the acoustic signal into the space, and the signal processing device generates the corresponding characteristic parameter of the space status.

11. The space status detection apparatus based on acoustic signal as claimed in claim 10, wherein the space status detection apparatus operates in an initial mode or in a detection mode, wherein the decision device comprises:
   a setting unit, receiving the characteristic parameter corresponding to the initial mode when the space status detection apparatus is operated in the initial mode, and determining a threshold according to the characteristic parameter corresponding to the initial mode; and
   a determination unit, coupled to the setting unit to receive the threshold, and receiving the characteristic parameter corresponding to the detection mode when the space status detection apparatus is operated in the detection mode, and determining whether the space status is changed according to the threshold and the characteristic parameter corresponding to the detection mode.

12. The space status detection apparatus based on acoustic signal as claimed in claim 11, wherein the setting unit sets the threshold according to a Z-test or an Euclidean distance.

13. The space status detection apparatus based on acoustic signal as claimed in claim 1, wherein the space where the space status detection apparatus is located is an indoor space, the acoustic signal transmitted by the audio transmitting device is an impulse, and the sensing signal is an impulse response.

14. A space status detection system based on acoustic signal, comprising the space status detection apparatus based on the acoustic signal as claimed in claim 1, and further comprising:
   an electronic apparatus; and
   a network device, and when the space status detection apparatus detects that the space status is changed, the space status detection apparatus transmits a message to the electronic apparatus through the network device.

15. A method for space status detection based on acoustic signal, adapted to a space status detection apparatus, the method comprising:
   transmitting an acoustic signal into a space, and receiving a varied acoustic signal that is the transmitted acoustic signal varied in the space to serve as a sensing signal, wherein the acoustic signal and the varied acoustic signal are audible sound waves;
   obtaining a characteristic parameter of a space status according to the sensing signal; and
   detecting a change of the space status according to the characteristic parameter.

16. The method for space status detection based on acoustic signal as claimed in claim 15, wherein the step of obtaining the characteristic parameter comprises:
   extracting a valid signal in the sensing signal; and
   generating the characteristic parameter according to the valid signal.

17. The method for space status detection based on acoustic signal as claimed in claim 16, wherein the sensing signal comprises a direct sound section and a reflection section.

18. The method for space status detection based on acoustic signal as claimed in claim 17, wherein the step of extracting the valid signal in the sensing signal comprises:
   filtering the direct sound section or noise of the sensing signal to obtain the valid signal,
   wherein the step of filtering the direct sound section of the sensing signal comprises:
      calculating an average amplitude of the sensing signal; and
      filtering a section of the sensing signal before the amplitude of the sensing signal keeps smaller than the average amplitude for a predetermined time.

19. The method for space status detection based on acoustic signal as claimed in claim 16, wherein the step of generating the characteristic parameter according to the valid signal comprises:
   calculating at least one parameter of the valid signal; and
   generating the characteristic parameter according to the at least one parameter of the valid signal,
   wherein the characteristic parameter comprises the at least one parameter or a statistic amount of the at least one parameter.

20. The method for space status detection based on acoustic signal as claimed in claim 19, wherein the at least one parameter comprises a frequency domain characteristic parameter or a time domain characteristic parameter, wherein the frequency domain characteristic parameter comprise audio spectrum envelop, audio spectrum centroid, audio spectrum spread, or audio spectrum flatness, the time domain characteristic parameter comprise partial energy of an amplitude of the valid signal, peak statistic of the amplitude of the valid signal, or a reverberation time of the space.

21. The method for space status detection based on acoustic signal as claimed in claim 20, wherein the step of generating the statistic amount of the at least one parameter comprises:
   calculating a first expectation value of the frequency domain characteristic parameter, a first standard deviation of the frequency domain characteristic parameter, a second expectation value of the time domain characteristic parameter, or a second standard deviation of the time domain characteristic parameter; and
   taking the first expectation value of the frequency domain characteristic parameter, the first standard deviation of the frequency domain characteristic parameter, the second expectation value of the time domain characteristic parameter, or the second standard deviation of the time domain characteristic parameter to serve as the statistic amount of the at least one parameter, or merging the first expectation value of the frequency domain characteristic parameter and the first standard deviation of the frequency domain characteristic parameter to serve as the statistic amount of the at least one parameter, or merging the second expectation value of the time domain characteristic parameter and the second standard deviation of the time domain characteristic parameter to serve as the statistic amount of the at least one parameter.

22. The method for space status detection based on acoustic signal as claimed in claim 15, wherein the step of transmitting the acoustic signal into the space comprises periodically or randomly transmitting the acoustic signal into the space, and the step of obtaining the characteristic parameter comprises periodically or randomly obtaining the corresponding characteristic parameter.

23. The method for space status detection based on acoustic signal as claimed in claim 22, wherein the step of detecting the change of the space status comprises:
   in an initial mode, determining a threshold according to the characteristic parameter corresponding to the initial mode; and in a detection mode, determining whether the space status is changed according to the threshold and the characteristic parameter corresponding to the detection mode.

24. The method for space status detection based on acoustic signal as claimed in claim 23, wherein a method for determining the threshold comprises:

setting the threshold according to a Z-test or an Euclidean distance.

25. The method for space status detection based on acoustic signal as claimed in claim 15, wherein the space is an indoor space, the acoustic signal is an impulse, and the sensing signal is an impulse response.

* * * * *